United States Patent [19]

Kawai et al.

[11] Patent Number: 4,480,661

[45] Date of Patent: Nov. 6, 1984

[54] AIR FLOW CONTROL VALVE MEANS

[75] Inventors: Yukio Kawai; Michio Morishita, both of Toyota; Hiromi Otsuki, Anjo; Takashi Kondo, Toyota, all of Japan

[73] Assignee: Nippondenso Co., Ltd., Kariya, Japan

[21] Appl. No.: 392,369

[22] Filed: Jun. 25, 1982

[30] Foreign Application Priority Data

Jul. 2, 1981 [JP] Japan .......................... 56-98640[U]

[51] Int. Cl.[3] .......................................... F16K 37/00

[52] U.S. Cl. ............................... 137/544; 137/550; 137/599.1; 261/121 B; 123/585

[58] Field of Search ........................... 137/544, 550; 261/121 B; 123/585

[56] References Cited

U.S. PATENT DOCUMENTS

| | | | |
|---|---|---|---|
| 1,095,510 | 5/1914 | Miller, Jr. | 261/121 B |
| 2,873,758 | 2/1959 | Nielsen | 137/599.1 |
| 3,188,055 | 6/1965 | Lutjens et al. | 137/599.1 |
| 3,987,131 | 10/1976 | Hisatomi et al. | 261/121 B |
| 4,108,121 | 8/1978 | Minami et al. | 261/121 B |
| 4,114,372 | 9/1978 | Ikeura | 261/121 B |
| 4,129,622 | 12/1978 | Tamazawa et al. | 261/121 B |

FOREIGN PATENT DOCUMENTS

| | | | |
|---|---|---|---|
| 3624 | 1/1979 | Japan | 261/121 B |

*Primary Examiner*—A. Michael Chambers
*Attorney, Agent, or Firm*—Cushman, Darby & Cushman

[57] ABSTRACT

An air flow control valve means for controlling air bleed of internal combustion engine. The air flow control valve means includes a valve housing, an air cleaner means attached to the valve housing, and a valve element adapted for opening and closing the air passage communicated with the air bleed passage. The valve housing is provided with tubular portions projected to the upstream side as viewed in the direction of flow of air introduced into the valve housing. The tubular portion has therein a bypass air passage which open at the end portion of the tubular portion. According to this arrangement, it is possible to avoid any foreign matters from coming into the bypass passage.

1 Claim, 1 Drawing Figure

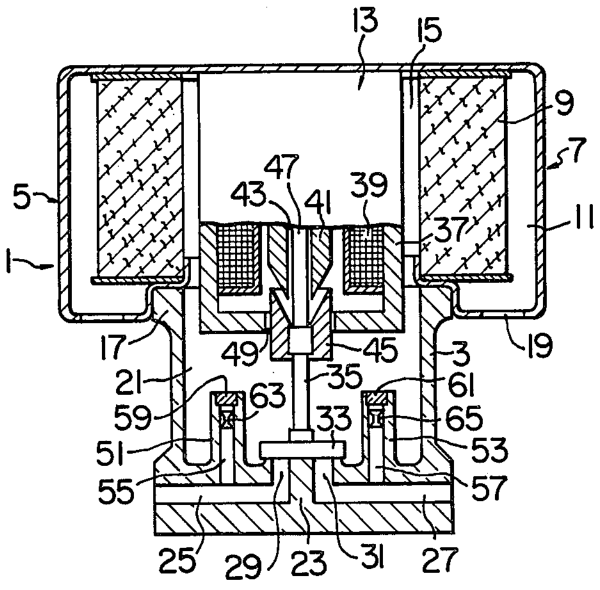
13
15
9
7
5
47
43
41
39
37
11
1
17
49
45
3
19
21
35
61
59
63
33
65
51
53
55
57
25
29
23
31
27

AIR FLOW CONTROL VALVE MEANS

BACKGROUND OF THE INVENTION

1. Field of the Invention

The present invention relates to an air flow control valve means and, more particularly, to an air flow control valve means for use in air bleed control in carburetors.

2. Description of the Prior Art

Hitherto, it has been proposed to control the air-fuel ratio of a mixture to be fed to an automotive engine by controlling the amount of air bleed to the carburetor. This air bleed control is achieved by opening and closing an air bleed passage by means of a control valve disposed at an air inlet end of the air bleed passage.

Some of the control valves used in air bleed control have an air flow passage opening adapted to be opened and closed by a valve element, and a bypass air passage having a smaller opening area than the above-mentioned opening which is continuously open to prevent fuel from flowing back through the air bleed passage when the first-mentioned opening is closed. In such a control valve, the bypass air passage is constructed to have an extremely small opening area in order to minimize the change in the rate of air bleed effected by the air flowing out of the bypass air passage. Therefore, the bypass air passage tends to become clogged with dust and other foreign material. This problem is serious particularly when the bypass air passage opens to the bottom portion of the valve housing, because, in such a case, the dust and foreign material falling onto the bottom wall of the valve housing tend to come into the opening of the bypass air passage together with the rain water or the like introduced into the valve housing. It is, therefore, extremely difficult to ensure safe operation of the bypass air passage for long periods of time without suffering clogging.

SUMMARY OF THE INVENTION

Accordingly, an object of the invention is to provide an air flow control valve means improved to suppress the tendency of clogging of the bypass air passage with dust and foreign material.

To this end, according to the invention, there is provided an air flow control valve means disposed in an air bleed passage comprising: a valve housing partially defining a chamber therein; air cleaner means having an air filter therein and connected to the valve housing; an air flow passage provided within the valve housing opening at one end into the chamber and at the other end into the outside; a valve element switching the opening and shutting of the air flow passage; means for actuating the valve element so as to open or shut the air flow passage; and a bypass air passage shunting from the air flow passage and continuously opening into the chamber, the bypass air passage incorporating a jet element therein so as to reduce the cross-sectional area thereof; wherein the valve housing comprises a tubular portion extending from end wall thereof substantially towards the upstream of an air to be introduced into the chamber and wherein the bypass air passage extends inside of the tubular portion and the opening thereof opens at an end portion of the tubular portion.

The above and other objects, features and advantages of the invention will be made more apparent from the following description with reference to the accompanying drawings.

BRIEF DESCRIPTION OF THE DRAWINGS

The attached sole FIGURE is a longitudinal sectional view of a valve means embodying the present invention.

DESCRIPTION OF THE PREFERRED EMBODIMENT

Referring to the sole FIGURE, an air flow control valve means generally designated at a reference numeral 1 has a substantially hollow valve housing 3 closed at its one end and a cylindrical air cleaner means 5 disposed on the other end of the housing 3. The cylindrical air cleaner means 5 includes an air filter casing 7 constituted by an end plate, tubular thin peripheral wall and an annulus end plate, an annular filter 9 concentrically received by the casing 7 so as to define an outer annular air gap 11 between itself and the casing 7, and an electromagnetic actuating means 13 disposed in the annular filter 9 so as to leave an inner annular gap 15 therebetween.

The cylindrical air cleaner means 5 is secured through a recess formed in the annulus end plate to an annular flange 17 provided at the open end of the valve housing 3. The annulus end plate of the air filter casing 7 is provided with an air inlet opening 19 formed therein.

The valve housing 3 defines a valve chamber 21 into which air is introduced through the air inlet opening 19, outer annular air gap 11, annular filter 9 and the inner annular gap 15. The end wall portion 23 of the valve housing 3 is provided with air flow passages 25 and 27 which each communicates at its one end with the valve chamber 21 and which is open at its other end to the outside of the valve housing 3. The openings 29 and 31 of the first-mentioned ends of respective air flow passages 25 and 27 are adapted to be opened and closed by a common valve element 33.

The valve element 33 is operatively connected through a stem 35 to the electromagnetic actuating means 13. The electromagnetic actuating means 13 has a cylindrical yoke 37 provided therein with a substantially annular solenoid coil 39, a stator core 41 fixed to the cylindrical yoke 37 and provided therein with a guide 43, and a moving core 45 axially slidably fitting in an opening 49 formed in one of the end walls of the cylindrical yoke, the moving core 45 having a guide bar 47 fixed to one end thereof and adapted to move along the guide 43 while the other end is connected to the stem 35.

As the annular solenoid coil 39 is energized, a magnetic field is formed through the annular solenoid coil 39, a portion of the cylindrical yoke 37, moving core 45, stator core 41 and again the annular solenoid coil 39. In consequence, the moving core 45, stem 35 and the valve element 33 as a unit are moved along a common aligned line overcoming the force of a return spring (not shown) thereby to open the openings 29 and 31. Then, as the annular solenoid coil 39 is deenergized, the valve element 33 is moved together with the moving core 45 and the stem 35 by the force of the return spring (not shown) thereby to close the openings 29 and 31.

The valve housing 3 is provided with tubular portions 51 and 53 which project from the end wall portion 23 towards the upstream side as viewed in the direction of flow of air introduced into the valve housing 3. The tubular portions 51 and 53 are provided therein with bypass air passages 55 and 57 which open at their one ends to the valve chamber 21 and at their other ends to the air flow passages 25 and 27. The openings of the bypass air passages 55 and 57 at the above-mentioned one ends are disposed at the upstream side of the openings 29 and 31 at the above-mentioned one ends of the air flow passages 25 and 27, and are provided with filter elements 59 and 61 fitted therein. The bypass air passages 55 and 57 are provided therein with jets 63 and 65 which determine the effective cross-sectional areas thereof. In order to minimize the rate of introduction of air through the bypass air passages 55 and 57, the jets 63 and 65 restrict the opening area of the bypass passages 55 and 57 to such values as being smaller than the areas of the openings 29 and 31 of the air flow passages 25 and 27.

Since the bypass air passages 55 and 57 open to the end portions of the tubular portions 51 and 53 projecting into the valve chamber 21 from the end wall portion 23 of the valve housing 3, dust and other foreign materials accumulated on the end wall portion 23 of the valve housing 3 are never brought into the bypass air passages. Also, rain water or the like introduced into the valve chamber 21 is prevented from being introduced into the bypass air passages 55 and 57. Furthermore, by positioning the upper end openings of the bypass air passages 55 and 57 at the upstream side of the openings 29 and 31 of the air flow passages, the level of water in the valve chamber, even if the water is accumulated in the valve chamber 21, cannot become higher than the upper end openings of the bypass air passages 55 and 57, because the water is conveniently discharged from the valve chamber 21 through the openings 29 and 31. In consequence, the introduction of water and, hence, the introduction of dust or foreign material into the bypass air passages 55 and 57 is avoided to prevent the bypass air passages 55 and 57 from being clogged with dust and foreign material.

What is claimed is:

1. An air flow control valve means disposed in an air bleed passage comprising:

a valve housing, said valve housing having a tubular chamber extending from an axial end wall to a position upstream of air flowing through said valve housing;

an air flow passage having one end extending through said axial end wall into said chamber and another end extending outside said valve housing;

valve means for controlling air flowing through said air flow passage;

means for actuating said valve means to open and shut said flow passage; and a bypass air passage having one end extending through said axial end wall into said chamber and another end communicating with said air flow passage, air flowing continuously between said air flow passage and said chamber, said bypass air passage end extending into said chamber from said axial end wall further than said air flow passage end;

a jet element disposed in said bypass air passage to reduce the effective cross-sectional area of said bypass air passage; and an air filter element disposed across and contiguous with said bypass air passage upstream from said jet element.

* * * * *